UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

DYE AND PROCESS OF MAKING SAME.

1,279,307.　　　　　Specification of Letters Patent.　　Patented Sept. 17, 1918.

No Drawing.　　　Application filed June 26, 1916.　Serial No. 105,822.

*To all whom it may concern:*

Be it known that I, CARLETON ELLIS, a citizen of the United States, and a resident of Montclair, in the county of Essex and State of New Jersey, have invented certain new and useful Improvements in Dyes and Processes of Making Same, of which the following is a specification.

This invention relates to a method of making dyestuffs of various kinds and particularly of the type known as sulfur black dyestuffs and in one phase is concerned with the formation of dyestuffs from aromatic bodies including nitrated aromatic bodies such as the nitrated chlorin compounds of various aromatic hydrocarbons and in particular dinitrochlorbenzol or equivalent body; and the invention further relates to a product obtained by such process, namely; a dyestuff of the sulfur black type, free or substantially free from nitro groups and in some cases containing certain mineral salts.

The process contemplates the treatment of phenolic bodies or of nitrated material of the character specified or equivalent material with an alkaline sulfid or equivalent reducing agent in aqueous solution and in some cases under superatmospheric pressure whereby the rapid formation of the dyestuff is obtained and whereby it is also possible to prepare a product free or practically free from nitro groups thereby rendering such material safer in drying, handling, storing and the like.

In the preparation of sulfur black from, for example, dinitrophenol, the latter material is mixed with a solution of sodium sulfid and boiled for a long period whereby reaction occurs and the dyestuff is formed. For the attainment of a sulfur black of a good quality this heating and boiling period is of considerable length. In the first instance usually a greenish-yellow product is formed, which on continued boiling changes to a greenish-black and finally to a blue-black which is the color usually desired in a sulfur black. The product is separated from the liquor and then dried. During the drying, oxidation or spontaneous combustion often occurs or certain side reactions progress in the mass to such an extent that the product may become seriously injured in quality. Vacuum driers are sometimes used to reduce the tendency of spontaneous combustion.

A further difficulty is the fact that when heating under ordinary pressure an excess of alkaline sulfid is not infrequently used in order to hasten the reaction and sulfur or sulfur forming compounds are left in the dyestuff. These in turn pass into the fabric when the dyestuff is employed in the dye vat and the sulfur in course of time oxidizes to sulfuric acid causing the fabric to rot. This change may take place weeks or months after the goods have been dyed.

By the present invention in its preferred form it is possible to more nearly adjust the proportions of alkaline sulfid to meet the requirements of reduction without using an excess to hasten the reaction to better develop the desired blue-black tone. Thus a more satisfactory product is obtained.

In one form of the invention, sodium sulfid may be employed and this compound may be prepared by reduction of sodium sulfite or sulfate with charcoal or the compound may be prepared by heating caustic soda or other suitable alkali with sulfur, carrying out the reaction either as a fusion, or boiling with water to form a solution of the sodium sulfid. In a similar manner calcium sulfid may be prepared and depending on the proportions of sulfur employed, a greater or less quantity of simple and complex sulfids such as the polysulfid and also the thiosulfate, dithionate and the like is obtained. The polysulfid of soda or potash likewise may be used.

The dinitrochlorbenzol or dinitrophenol when the form of the invention contemplates the direct use of either of these materials, may be mixed with such sulfur solutions and heated under atmospheric pressure or under a pressure from a few pounds up to fifty to one hundred pounds or even higher for a short time in order to produce the coloring matter. Depending on the pressure and concentrations employed, a more or less complete reduction of the nitro compound is effected in a greater or less period of time.

When dinitrophenol is used directly no allowance need be made for excess of alkali such as is required in the case of dinitrochlorbenzol to remove the chlorin group and form the dinitrophenol *in situ*. The liberation of dinitrophenol in a nascent condition, as it were, has certain advantages.

While, as stated, sodium sulfid may be used advantageously in certain phases of the present procedure the present invention is also illustrated in the special case of lime sulfur solution as the reactive agent. For example, 350 grams of quick lime are heated and 300 grams of sulfur added. This is boiled until an orange-yellow solution is obtained and the solution is strained through an iron screen. 200 grams of dinitrophenol are added and the mass is heated at atmospheric pressure or under a pressure of about 50 to 75 pounds at a temperature ranging from say 130–160° C. for a brief period usually 1 to 4 hours. At the end of this time the blue-black dyestuff is substantially free from any appreciable amount of detrimental organic nitro bodies. The separation of the dyestuff from the alkaline solution may be effected in various ways. If sodium sulfid is the reagent employed sulfuric acid may be added to throw down the dyestuff. In the case of calcium sulfid, hydrochloric acid liberates the dyestuff without throwing down an insoluble calcium salt. If filling material is desired sulfuric acid may be used in the latter case forming calcium sulfate which serves as a filling and extending body. The presence of certain salts in the dye bath favor the operation of dyeing. Or the dyestuff may be precipitated along with calcium sulfate and the latter subsequently extracted by means of a weak alkaline sulfid solution. By passing carbon dioxid into the calcium sulfid solution of the dyestuff calcium carbonate is obtained and the dyestuff is precipitated. By carbonating sodium sulfid solution in a similar manner the dyestuff is thrown down as a coherent plastic mass and sodium carbonate is obtained which is recausticized and sodium sulfid prepared therefrom.

In preparing sodium sulfid or calcium polysulfid solution by boiling together the alkali or alkaline earth and flowers of sulful, usually some variation in the composition of the material is experienced from time to time and it is desirable either to analyze every lot or make a trial run on a small scale to ascertain just the proportions required so that the desired effective reduction and conversion may take place with a minimum amount of the sulfid material and such adjustment of proportions by preliminary trial or observation is therefore in order under these conditions.

When the sulfur black material has been prepared with approximately an equivalent amount of sodium sulfid or calcium sulfid so that on acidification to separate the dyestuff no excess of sulfur remains, it may be desirable in some cases to wash the product with boiling water which may be done to advantage under suction to remove all impurities soluble in hot water. This advantageously removes any objectionable salts and any soluble organic compounds of an undesirable character which may be present. The same washing treatment also may be used in cases where an excess of sulfur or sulfid reagent is employed. In other cases the removal of the salts is not necessary or desirable as they beneficially affect the fixation of the dye on certain fibers. Hence in some cases calcium chlorid for example may be allowed to remain in the material. Sodium chlorid likewise may be formed and preserved in the dyestuff mass.

In another case one part of lime, with about two parts of surfur and ten parts of water were boiled for one and one-half hours and the clear liquor decanted after settlement. This gave a solution having a strength of between 25 and 32° Bé. The residuum contained sulfur, unchanged lime and also silica and other non-calcareous material contained in the lime. When using lime containing magnesia care should be taken in boiling the composition as the fumes of hydrogen sulfid are liable to have unpleasant effects.

A mixture of dinitrophenol and this polysulfid of lime composition when boiled in a reflux condenser for ten hours affords a black product which may be separated from the solution. By acidification, boiling, and filtering, a dark gray to black powder is obtained which contains more or less free sulfur. This dyestuff dyes cotton black in an alkali bath.

By treatment of dinitrophenol six parts, slaked lime ten parts, sulfur ten parts and water fifty parts by weight at a boiling temperature for ten hours a black dyestuff is obtained which may be separated from the liquor by acidification. It dyes cotton a good black in alkali sulfid bath.

Seven parts by weight of dinitrochlorbenzol, eighteen parts sulfur and fifteen parts of slaked lime are boiled with one hundred parts of water for about ten hours and the precipitate on acidification collected and washed. This dyestuff dyes cotton a deep brown in a sodium sulfid bath.

In another case 10 parts by weight of sodium sulfid crystals, 2 parts of sulfur and 6 parts of water were placed in a kettle and heated in an open kettle until all was in solution when 2 parts of dinitrophenol were slowly added and the whole heated for a period of about 4 hours. During the last hour, however, the reaction mass was allowed to dry down to the form of a paste in which condition it was heated and well stirred. By this final heat treatment in paste form the temperature rose many degrees and this higher temperature enabled a more complete reaction to take place resulting in a dye of better color than when such treatment was not carried out. 1 lb. of the dinitrophenol gave approximately 1.5 lbs. of dye free from ash.

5 parts of the sulfur black obtained in this manner, 15 parts of sodium sulfid crystals, 15 parts of salt, 15 parts of sodium carbonate and 200 parts of water were boiled in a dye kettle and cotton cloth steeped in this dye for one hour when it was converted into a black of the desired bluish black tint. In another case 450 parts of sodium sulfid, 30 parts of dinitrophenol, 60 parts of cresylic acid, 400 parts of water and 90 parts of sulfur was boiled down slowly to a paste, in which condition it was heated to fusion with agitation for about one hour when the dye was separated and washed. The product was free from odor of cresol and the conversion of the latter was apparently complete. In the utilization of cresol or cresylic acid as a component of the raw mix for making sulfur black care should be taken to have sufficient alkali present to combine with the cresylic acid so that enough alkali will remain to hold the sulfur in solution as otherwise a satisfactory reaction is not as easily effected.

A dyestuff made from cresol alone is prepared by mixing 18 lbs. by weight of crystallized sodium sulfid ($Na_2S.9H_2O$), 3 lbs. sulfur, 3 lbs. cresol (cresylic acid) 1 lb. caustic soda and 6 lbs. water and boiling down to a paste which is heated with stirring and addition of water if necessary, until a black dyestuff is obtained. The temperature of the fused paste during the reaction period may be held at 150–180° C. when heating in an open kettle, at which temperature the reaction progresses favorably in the fused material. Ortho, meta or para cresol or mixtures of these may be used but preferably the ordinary commercial cresylic acid is suitable for the purpose.

What I claim is:—

1. The process of making black dyestuffs which comprises heating nitrated aromatic material comprising a phenol with a reagent comprising aqueous alkaline sulfid material until complete reduction of all nitro groups is effected, whereby a product not spontaneously heating on drying is obtained.

2. The process of making black dyestuffs which comprises heating nitrated material comprising dinitrophenol with a reagent comprising aqueous alkaline sulfid material under effective denitrating conditions until complete reduction of all nitro groups is effected, whereby a product not spontaneously heating on drying is obtained.

3. The process of making dyestuffs of the sulfur black type which comprises heating nitrated material comprising a nitrophenol with aqueous alkaline sulfid material in substantially reacting proportions under super-atmospheric pressure until substantially complete reduction of all nitro groups is effected and a product capable of being dried at ordinary atmospheric pressure without undergoing decomposition is obtained.

4. The process of making dyestuffs of the sulfur black type which comprises heating nitrated material comprising a nitrophenol containing at least one nitro group with aqueous alkaline sulfid material in substantially reacting proportions until substantially complete reduction of all nitro groups is effected and a product capable of being dried at ordinary atmospheric pressure without undergoing decomposition is obtained.

5. The process of making dyestuffs of the sulfur black type which comprises heating nitrated material comprising a dinitro derivative of benzol with aqueous alkaline sulfid material in substantially reacting proportions until substantially complete reduction of all nitro groups is effected and a product capable of being dried at ordinary atmospheric pressure without undergoing decomposition is obtained.

6. The process of making dyestuffs of the sulfur black type which comprises heating nitrated aromatic material with aqueous alkaline sulfid material until substantially complete reduction of all nitro groups is effected and a blue-black coloring agent capable of being dried without side reactions at ordinary atmospheric pressure is obtained.

7. The process of making dyestuffs of the sulfur black type which comprises heating nitrated aromatic material comprising a phenol with aqueous alkaline sulfid material in substantially equivalent proportions under super-atmospheric pressure until substantially complete reduction of all nitro groups is effected and a substantially sulfur-free coloring agent capable of being dried at ordinary pressure without undergoing decomposition is obtained.

8. The process of making dyestuffs of the sulfur black type which comprises heating nitrated material comprising dinitrophenol with aqueous alkaline sulfid material under at least atmospheric pressure until a blue-black dyestuff is formed and nitro groups are substantially eliminated, whereby a product not spontaneously heating during drying is obtained.

9. The process of making dyestuff of the sulfur black type which consists in heating a reaction mass containing nitrated aromatic material and aqueous alkaline sulfid material at a temperature where denitration takes place and in continuing the heating until reduction of substantially all nitro groups is effected and a bluish-black coloring agent capable of being dried without spontaneously heating when oven-dried at ordinary atmospheric pressure is obtained.

CARLETON ELLIS.